United States Patent Office 3,269,929
Patented August 30, 1966

3,269,929
PROCESS FOR THE PHOTOOXYGENATION OF ANHYDROTETRACYCLINES
Manfred Schach von Wittenau, Gales Ferry, Conn., assignor to Chas. Pfizer & Co., Inc., New York, N.Y., a corporation of Delaware
No Drawing. Filed Oct. 12, 1962, Ser. No. 230,252
6 Claims. (Cl. 204—158)

This invention relates to an improved oxidation process, and more particularly to an improved process for oxygenation of anhydrotetracyclines to certain hydroperoxy dehydrotetracyclines, which are useful intermediates.

It is known that the conversion of 5a,6-anhydrotetracyclines to the corresponding dehydrotetracyclines may be effected by the photooxygenation procedure of Scott and Bedford, as described in the Journal of the American Chemical Society, volume 84, pp. 2271–2 (1962). In accordance with this procedure the anhydrotetracycline is oxidized to the corresponding 6-deoxy-6-hydroperoxy dehydrotetracycline by contacting a solution of the starting compound in a reaction-inert solvent with oxygen or air while irradiating with light of about 300–450 μ wave length; and subsequently reducing the hydroperoxy compound to the desired dehydrotetracycline, for example by treatment with an aqueous solution of an alkali metal sulfite or hydrosulfite, or by hydrogenation in the presence of a noble metal catalyst such as palladium or rhodium.

Now it has been discovered that the photooxygenation step of the process may be strikingly accelerated and yields substantially improved by incorporation of trace quantities of an additive in the reaction mixture. The additives which confer these valuable advantages are polycyclic aromatic compounds including certain benzpyrenes and phenanthrenes. Particularly preferred are 1,2- and 3,4-benzpyrene; cholanthrene; 18-, 19- and 20-monomethylcholanthrene; 1,2,5,6-dibenzanthracene; and phenanthrenes of the formula

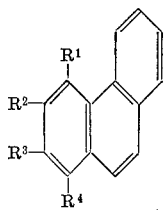

wherein at least one adjacent pair of said $R^1$, $R^2$, $R^3$ and $R^4$ substituents completes a fused ring selected from the group consisting of benz- and monomethylbenz-, and, where only one R substituent pair completes a fused ring, one of the two remaining R substituents is methyl, the other being selected from the group consisting of hydrogen and methyl.

It will be recognized that the foregoing structural formula includes certain phenanthrenes which are substituted at the 1-, 2-, 3- or 4-positions:

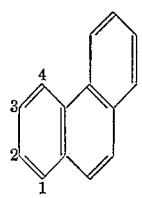

namely, 1,2-benzanthracenes

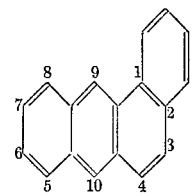

having methyl at the 9- and/or 10-positions, and optionally at one of the 5-, 6-, 7- or 8-positions; as well as 3,4-benzphenanthrenes, i.e. benzo[c]phenanthrenes of the structure

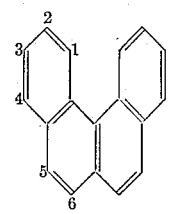

having methyl at the 5- and/or 6-positions, and optionally at one of the 1-, 2-, 3- or 4-positions; likewise 1,2-benzphenanthrenes, i.e. chrysenes of the structure

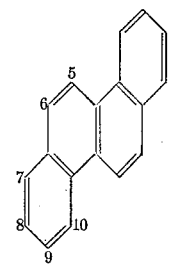

having methyl at the 5- and/or 6-positions and optionally at one of the 7-, 8-, 9- or 10-positions; and also 1,2,3,4-dibenzphenanthrenes, i.e. benzo[g]chrysenes of the structure

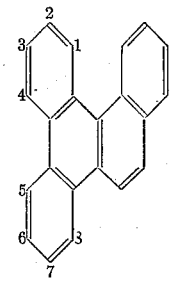

optionally having a methyl substituent at one of the first 4 and/or second 4 numbered positions.

These additives provide their beneficial effect in the new process of the present invention over a broad range of concentrations. Ordinarily at least about 0.0005% w./v. (i.e., 5 mg. per liter) based on the volume of the reaction mixture will be preferred for best results. Concentrations up to 0.005% w./v. and even higher may be employed, but the added advantage of concentrations above 0.005% is usually negligible. The additives described are usually completely soluble in the reaction mixtures at the preferred concentrations.

The improved oxidation process of this invention is preferably effected by dissolving or dispersing the anhydrotetracycline and the additive in a reaction-inert solvent, i.e. one which is substantially inert to the effects of oxygen and light under the reaction conditions, and introducing molecular oxygen (in the form of air, if desired) into the solution or dispersion while irradiating with light. A minimum of laboratory experimentation will permit the selection of appropriate solvents. Those suitable include aromatic solvents such as benzene, toluene or xylene, as well as cyclohexane and the like. The concentration of the anhydrotetracycline in the solvent is not critical; the saturation concentration corresponding to the particular anhydro compound and solvent, often about 0.1–0.5% w./v., may be conveniently employed.

The light is advantageously of a wavelength above 300 m$\mu$, and preferably about 300 to 450 m$\mu$. In order to conveniently achieve this, the reaction may be carried out in a vessel constructed of a material such as Vycor or Pyrex glass, which filter out substantially all the light passing through the vessel having a wavelength below 270–320 m$\mu$.

The temperature at which the oxidation is carried out is not particularly critical for good yields of product, but is conveniently within the range from 20° to 40° C.: for instance, from 25° to 30° C.

The time required for substantial conversion of the anhydrotetracycline to the corresponding hydroperoxide will naturally vary widely with reaction conditions, including the light intensity, the temperature, and the oxygen flow rate, and is therefore best determined by trial in the individual case. The time required is found to be substantially reduced in the presence of the described additives, sometimes to as little as 10% of that required in their absence, and excellent conversions have been obtained in 4 hours. An additional benefit accrues from the fact that prolonged reaction times can lead to degradation of product already formed, particularly where the product remains in solution throughout the reaction, as is often the case. Thus, in many instances higher yields are achieved than could be obtained without additive, and refining is simplified.

If the hydroperoxide product crystallizes from the reaction mixture, as is observed in the case of 7-chloro-6-deoxy-6-hydroperoxy-dehydrotetracycline in benzene medium, it is readily recovered by filtration. In many cases, however, the product remains in solution and may be recovered, for example by concentration of the reaction mixture or addition of a non-solvent such as hexane, or a combination of such procedures. After isolation, the reaction products may be further purified by any of the general known methods, including recrystallization from various solvents and mixed solvent systems, chromatography and solvent distribution.

The nature of the improved process is such that it is widely applicable to the conversion of the anhydrotetracyclines as a class to the corresponding hydroperoxides, which may in turn be reduced to the corresponding dehydrotetracyclines. Anhydrotetracyclines each contain a double bond at the 5a,6-position. A great variety are already described in the literature, including anhydrotetracyclines, anhydrochlortetracycline, anhydrobromtetracycline, anhydrooxytetracycline, and their various derivatives, including the 4-epi-, the 4-desdimethylamino-, the 6-demethyl-, and the 12-a-deoxy-derivatives. In addition, syntheses of a variety of anhydrotetracyclines are shown in the literature, e.g., in the Journal of The American Chemical Society, volume 81, p. 1006 ff. (1961); as well as in Chem. Berichte, volume 92, p. 3122 ff. (1959) and U.S. Patent 3,002,993. The preparation of anhydrotetracyclines containing alkyl substitutents in the D-ring, and their N-alkyl carboxamido derivatives, is described in U.S. Patents 2,895,993 and 3,028,409. Further, anhydrodiacetyloxytetracycline and 12a-deoxy-12a-methyl-anhydrooxytetracycline are described in Canadian Patent 534,669; and bromanhydro-12a-bromo-12a-deoxy desdimethylaminotetracycline is described in U.S. Patent 3,013,075.

Among the valuable 6-deoxy-6-hydroperoxy-dehydrotetracycline intermediates produced by the present improved process are those of the formula

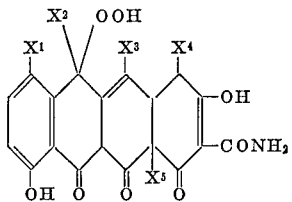

wherein $X^1$ is selected from the group consisting of hydrogen, chloro and bromo; $X^2$ is selected from the group consisting of hydrogen and methyl; $X^3$ is selected from the group consisting of hydrogen and hydroxy, provided that $X^1$ is hydrogen when $X^3$ is hydroxy; $X^4$ is selected from the group consisting of hydrogen and dimethylamino; and $X^5$ is selected from the group consisting of hydrogen and hydroxy.

Thus, for example, application of the present improved procedure to anhydrotetracycline provides 6-deoxy-6-hydroperoxy-dehydrotetracycline; whereas anhydrochlortetracycline and anhydrooxytetracycline provide the respective 7-chloro and 5-hydroxy derivatives.

While the products obtained herein are shown above in the form of $\Delta 5,5a$ enolizable 11,12-diketones, they also exist in equilibrium with the corresponding $\Delta 5a,11a$ structure, and it is to be understood that the term "dehydrotetracycline" whenever employed herein and in the claims embraces the equivalent $\Delta 5a,11a$- and 5,5a-enolic and ketonic tautomers.

The 6-deoxy-6-hydroperoxy dehydrotetracyclines of the improved process of this invention are suitable for reduction to the corresponding dehydrotetracyclines. This reduction step may be conducted in any of a variety of ways. Thus, for example, the hydroperoxide may be reduced by hydrogenation in the presence of a noble metal catalyst. Such catalysts include the platinum group metal catalysts, particularly palladium, supported palladium such as palladium-charcoal catalysts, rhodium, and the like. Catalytic hydrogenation is conveniently conducted in a reaction-inert solvent for the hydroperoxide, i.e. a solvent which does not react in an undesired manner with the reactants or product. A variety of solvents may be used for this purpose, and routine laboratory experimentation will readily permit the selection of the most suitable solvent for any specific starting compound. Generally, lower alkanols, e.g. methanol and ethanol, are found to be satisfactory, and a variety of other solvents may also be used, including glacial acetic acid, aqueous alcohol, 0.01 N methanolic HCl, and the like. Pressures of hydrogen gas ranging from atmospheric to superatmospheric are appropriate, but substantially atmospheric pressure will often be selected as most convenient. The noble metal catalyst employed may already contain sufficient occluded hydrogen to permit the desired reduction to take place without the use of additional hydrogen gas. The hydroperoxytetracycline compound, may for example, be shaken in methanol solution with hydrogen and catalyst until one molar proportion of hydrogen is absorbed; if desired, the hydrogenation may be continued until the dehydrotetracycline double bond is also saturated to provide the final tetracycline. At the conclusion of the reaction, the product is recovered by standard procedures, e.g. by filtering and evaporating the filtrate, preferably under vacuum.

In another method for conducting the reduction, any one of a variety of chemical reducing agents may be employed. These include active metals in mineral acids, e.g. zinc in dilute hydrochloric acid; as well as sodium iodide in a halogen acceptor solvent such as acetone or methanol, preferably in the presence of zinc metal. A particularly preferred chemical reduction procedure involves contacting the hydroperoxide with an aqueous solution of an alkali metal sulfite or hydrosulfite, preferably the readily available sodium sulfite or a sodium hydrosulfite. For such treatment, it is usually preferred to employ the hydroperoxide in solution in a reaction-inert solvent such as chloroform. After intimate contact between the aqueous and the organic solutions, the two phases are separated and the product recovered from the organic phase by evaporation of the solvent.

The dehydrotetracyclines are useful intermediates, and may be converted to the corresponding tetracyclines by microbiological reduction or by catalytic hydrogenation, as described, for example, in the Journal of the American Chemical Society, volume 80, pp. 5572 ff. and 6460 ff. (1958), and in U.S. Patents 2,965,546 and 3,005,023. As previously noted, catalytic reduction of the hydroperoxide to the dehydrotetracyclines may be continued, if desired, until the tetracycline is formed, without the necessity for isolation of the dehydro compound. Continued reaction may lead to further hydrogenolysis, e.g. removal of a 7-halo substituent, particularly when palladium is employed as catalyst. In aqueous media, e.g. aqueous alcohol, one-step reduction of the hydroperoxide to the corresponding tetracycline is often facilitated by conducting the reaction at about pH 4. This is conveniently effected in buffered solution, continuing until the calculated hydrogen has been consumed. On the other hand, if isolation of the dehydrotetracycline is desired, the hydroperoxide group may be reduced to hydroxy without hydrogenating the double bond, by halting the reaction as soon as an equimolar proportion of hydrogen has been consumed. Retention of 7-halo groups, where present, is favored where rhodium catalyst is employed.

By these procedures the dehydrotetracyclines yield known tetracycline antibiotics having therapeutic value or other biological activity, as well as new tetracyclines which possess valuable antimicrobial activity by virtue of their structural similarity to the known tetracyclines. In addition, some of the dehydrotetracyclines themselves exhibit useful antimicrobial activity.

The following examples are provided merely for illustrative purposes, and should not be interpreted as limiting the invention, many variations of which are possible within the spirit and scope thereof.

*Example 1.—7-chloro-6-deoxy-6-hydroperoxy-dehydrotetracycline*

1200 ml. of a benzene solution containing 2.97 g. 7-chloro-5a,6-anhydrotetracycline base and 25 mg. 3,4-benzpyrene is transferred to a vertical cylinder about 100 mm. in diameter closed near the lower end by a fritted glass disc to act as a sparger for oxygen introduced through a stopcock at the bottom. Into the solution is inserted a double-walled quartz Hanovia immersion well connected for circulation of cooling water between the walls; and a 450 watt Hanovia ultraviolet lamp with Pyrex glass sleeve is mounted inside the well. Oxygen is introduced through the stopcock at the rate of about 350 ml. per minute while irradiating the solution and circulating cooling water through the well jacket to maintain the reaction mixture at about 20–30° C. Crystals are seen to form in the reaction mixture after 40 minutes, and in about 3 hours crystallization is substantially complete. Oxygenation and irradiation are continued for a total of 5 hours, when an 80% yield of the desired product is recovered by filtration. Another 3% is recovered by evaporation of the filtrate. The production exhibits ultraviolet absorption maxima at 250 and 372 m$\mu$ ($\epsilon_{250}/\epsilon_{372}$=5.5) in 0.01 N methanolic HCl.

In the absence of benzpyrene, a 42% yield is obtained in 4 hours under the described conditions.

*Example 2.—7-chloro-6-deoxy-6-hydroperoxy-dehydrotetracycline*

The experiment of Example 1 is repeated, employing a 100 watt Hanovia Photochemical ultraviolet lamp and substituting 25 mg. 1,2-benzpyrene for the 3,4-benzpyrene of the other example. A 28% yield of product is recovered in 4 hours, and the filtrate is suitable for continued reaction. Substantially the same result is obtained with 15 mg. 1,2-benzpyrene. In the absence of benzpyrene, no product at all crystallizes in 6 hours under these reaction conditions, even after seeding, and after 22 hours only a trace is obtained. In 53 hours' reaction a substantial yield of product is observed in the absence of the additive.

*Example 3*

The reactions of Examples 1 and 2 are repeated in a series of experiments, substituting an equal weight of one of the compounds listed below for the benzpyrenes of the previous examples. In each case, the yields of product are substantially greater than those obtained with no additive.

3,5-dimethyl benzo [c] phenanthrene
1,5,6-trimethyl benzo [c] phenanthrene
6,8-dimethylchrysene
5,6,10-trimethylchrysene
1,2-benz-3-methylphenanthrene
1,2-benz-4-methylphenanthrene
1,2-benz-3,4-dimethylphenanthrene
1-methyl-3,4-benzphenanthrene
1,5-dimethyl benzo [g] chrysene
3,7-dimethyl benzo [g] chrysene

*Example 4.—Carboxamido N-t-butyl-7-chloro-6-deoxy-6-hydroperoxy-dehydrotetracycline*

800 ml. of a benzene solution containing 4.0 g. carboxamido - N-t-butyl-7-chloro-5a,6-anhydrotetracycline (U.S. Patent 3,028,409) and 25 mg. 1,2-benzpyrene is oxygenated for 4.5 hours by the procedure of Example 1.

The reaction mixture is then evaporated to 50 ml. and treated with hexane to initial clouding. The solution is clarified by filtration, permitted to stand overnight, and then filtered to collect 244 mg. of deposited product. The mother liquor is treated with further hexane and an additional 1.28 g. of solid product recovered. Upon slow evaporation the final filtrate deposits a further 385 mg. of product.

The final crystalline crop, after two recrystallizations from hexane, melts at 160–171° C. with decomposition. Elemental analysis: calculated for $C_{26}H_{29}O_9N_2Cl$, C 56.88%, H 5.32%, N 5.10%; found: C 56.65%, H 5.38%, N 4.80%. An infrared absorption maximum is observed at 5.82$\mu$ in potassium bromide; ultraviolet absorption maxima in methanolic HCl occur at 253 and 376 m$\mu$ ($\epsilon_{253}/\epsilon_{376}$=5.75). The product appears to be primarily in the form of the ketonic tautomer.

Substantially the same result is obtained with 5 mg. of 1,2-benzpyrene or 5,6-dimethylchrysene.

*Example 5.—9,N-di-t-butyl-7-chloro-6-deoxy-6-hydroperoxy-dehydrotetracycline*

1.0 g. of 9,N-di-t-butyl-7-chloro-5a,6-anhydrotetracycline (U.S. Patent 3,028,409) is dissolved, together with 25 mg. 3,4-benzpyrene, in 800 ml. benzene, and oxygenated as described in Example 1, for 4 hours at an oxygen rate of about 250 ml. per minute. The reaction mixture is then concentrated by evaporation under vacuum, and treated with hexane to obtain 780 mg. of solid product. This is recovered by filtration and recrystallized from cold ethanol. Ultraviolet absorption maxima are observed at 381 m$\mu$ in methanolic HCl, and at 240, 270 and 405–415 m$\mu$ in methanolic NaOH. An infrared absorption maximum is observed at 5.83$\mu$ in potassium bromide. The product appears to be primarily in the form of the ketonic tautomer.

This reaction is repeated, substituting cyclohexane for the benzene reaction medium, with substantially the same result.

The product is reduced in the following manner: 200 mg. of 5% palladium on carbon is pre-hydrogenated in 50 ml. of a mixture of 2 volumes isopropanol to 1 volume of 1:10 pH 4 aqueous buffer. 200 mg. of the hydroperoxy dehydrotetracycline, dissolved in 100 ml. of the same solvent, and readjusted to pH 4.0 with 2 N HCl, is added, and the mixture is hydrogenated at atmospheric pressure and room temperature for 1.5 hours, to consume 19.4 ml. hydrogen. The reaction mixture is then diluted with 200 ml. water and concentrated to evaporate the alcohol. The product is extracted into two 50 ml. portions ethyl acetate, and the combined extracts are washed with 3×50 ml. water plus 1×50 ml. 0.1 N hydrochloric acid, and then dried with sodium sulfate. Evaporation of the ethyl acetate gives 9,N-t-butyl tetracycline, having UV absorption maxima in methanolic caustic at 237 and 380 m$\mu$; and in methanolic HCl at 225, 270, 340 and 370 m$\mu$.

The reduction of the title product may also be halted at 9,N-di-t-butyl-7-chloro-dehydratetracycline by substituting rhodium catalyst for palladium, employing 1:1 by volume methanol: 0.01 N HCl as reaction medium, and terminating the reaction when an equimolar proportion of hydrogen has been consumed.

*Example 6.—6-deoxy-6-hydroperoxy-dehydrotetracycline*

25 mg. 1,2-benzpyrene is added to 1200 ml. of a saturated benzene solution of anhydrotetracycline base, and the resulting solution is irradiated and oxygenated for 6 hours according to the procedures of Example 1. The reaction mixture is then filtered, and the filtrate is combined with 100 ml. 0.01 N HCl, 3 ml. 2N HCl and 750 ml. hexane. The phases are separated and the aqueous phase is lyophylized to yield 1.05 g. of product. It is converted to tetracycline in the following manner:

500 mg. 5% palladium on carbon is slurried with 50 ml. of 1:1 by volume 0.01 N HCl:methanol and prehydrogenated. 500 mg. of crude 6-deoxy-6-hydroperoxy-dehydrotetracycline is then dissolved in 20 ml. methanol plus 20 ml. 0.01 N HCl and combined with the catalyst slurry. The mixture is hydrogenated at atmospheric pressure and room temperature for 3 hours 10 minutes, when the rate of hydrogen uptake has become negligible. The reaction mixture is filtered, concentrated to remove methanol, and lyophylized. The solid obtained, 251 mg., has a biopotency of 165$\mu$ per mg. vs. *K. pneumoniae* and is demonstrated to contain tetracycline by paper chromatography.

Substantially the same result is obtained by substituting 9- or 10-methyl-1,2-benzanthracene for the 1,2-benzpyrene in the photooxygenation reaction.

*Example 7.—4-desdimethylamino-7-chloro-6-deoxy-6-hydroperoxy-dehydrotetracycline*

This product is prepared by oxygenation of a 0.1% w./v. toluene solution of 4-desdimethylamino-7-chloro-5a,6-anhydrotetracycline containing 0.003% w./v. 1,2,3,4-dibenzphenanthrene at 20–30° C., introducing oxygen at the rate of 0.5 volume per minute per volume of solution while irradiating with a 450 watt ultraviolet lamp as described in Example 1. When paper chromatography of a sample demonstrates substantial disappearance of the starting compound, the reaction mixture is concentrated and treated with hexane to precipitate the product.

The reaction is successfully repeated, substituting cholanthrene, and 20-methylcholanthrene for the dibenzphenanthrene.

*Example 8*

The reactions of Examples 4–7 are repeated in a series of experiments, substituting an equal weight of one of the compounds listed below for the benzpyrene and other additives of the previous examples, to produce good yields of product in each case.

1,2,3,4-dibenzphenanthrene
1,2-dimethyl-3,4-benzphenanthrene
6,10-dimethyl-1,2-benzanthracene
7,9-dimethyl-1,2-benzanthracene
8,9-dimethyl-1,2-benzanthracene
5,9,10-trimethyl-1,2-benzanthracene
5,7-dimethylchrysene
6,9-dimethylchrysene
5,10-dimethylchrysene
5,6,8-trimethylchrysene
1,5-dimethyl benzo[c]phenanthrene
2,6-dimethyl benzo[c]phenanthrene
4,6-dimethyl benzo[c]phenanthrene
3,5,6-trimethyl benzo[c]phenanthrene
1-methyl benzo[g]chrysene
3-methyl benzo[g]chrysene
5-methyl benzo[g]chrysene
7-methyl benzo[g]chrysene
2,6-dimethyl benzo[g]chrysene
4,8-dimethyl benzo[g]chrysene

*Example 9.—6,12a-dideoxy-6-hydroperoxy-dehydrotetracycline*

This product is prepared in good yield by the procedure of Example 7, employing 0.003% w./v. 1,2,5,6-dibenzanthracene in place of the dibenzphenanthrene of the earlier example.

*Example 10.—5-hydroxy-6-deoxy-6-hydroperoxy-dehydrotetracycline*

This product is prepared by photooxygenation of anhydrooxytetracycline by the procedure of Example 7, employing 0.0005% w./v. 5,9-dimethyl-1,2-benzanthacene in place of the dibenzphenanthrene, and air in place of oxygen.

*Example 11.—7-bromo-6-deoxy-6-hydroperoxy-dehydrotetracycline*

The procedure of Example 7 is repeated, substituting 7-bromanhydrotetracycline as the starting compound and 5,10-dimethyl-1,2-benzanthracene, as the additive, to prepare this product in good yield.

*Example 12.—4-desdimethylamino-5-hydroxy-6-deoxy-6-hydroperoxy-dehydrotetracycline*

This product is prepared by photooxygenation of 4-desdimethylamino anhydrooxytetracycline in the presence of 9,10-dimethyl-1,2-benzanthracene by the procedure of Example 7.

*Example 13.—4-desdimethylamino-5-hydroxy-6,12a-dideoxy-6-hydroperoxy-dehydrotetracycline*

The procedure of Example 7 is repeated, substituting 4-desdimethylamino-12a-deoxy-anhydrooxytetracycline for the starting compound of the earlier example, and 2-methyl-3,4-benzphenanthrene as the additive, to prepare this product.

*Example 14.—4-desdimethylamino-7-chloro-6-deoxy-6-hydroperoxy-dehydrotetracycline*

This product is prepared from 4-desdimethylamino-7-chloranhydrotetracycline as described in the earlier examples, employing 0.002% 18-methylcholanthrene as the additive.

*Example 15.—4-desdimethylamino-6-deoxy-6-hydroperoxy-dehydrotetracycline*

This product is prepared from 4-desdimethylamino-anhydrotetracycline in the presence of 0.002% 19-methylcholanthrene as described in the preceding examples.

What is claimed is:

1. In the process for photooxygenation of an anhydrotetracycline to the corresponding 6-deoxy-6-hydroperoxy dehydrotetracycline in a reaction-inert solvent by introduction of molecular oxygen during irradiation with light of wavelength between 300 and 450 m$\mu$, the improvement which comprises conducting said oxygenation in the presence of at least about 0.0005% w./v. of a dissolved additive in said solvent, said additive being selected from the group consisting of 1,2- and 3,4-benzpyrene; cholanthrene; 18-, 19-, and 20-monomethylcholanthrene; 1,2,5,6-dibenzanthracene; and phenanthrenes of the formula

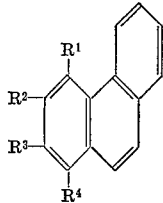

wherein at least one adjacent pair of said $R^1$, $R^2$, $R^3$ and $R^4$ substituents completes a fused ring selected from the group consisting of benz- and monomethylbenz-, and, where only one R substituent pair completes a fused ring, one of the two remaining R substituents is methyl, the other being selected from the group consisting of hydrogen and methyl.

2. A process as in claim 1 wherein said additive is 3,4-benzpyrene.

3. A process as in claim 1 wherein said additive is 1,2-benzpyrene.

4. A process as in claim 1 wherein said anhydrotetracycline is anhydrochlortetracycline.

5. A process as in claim 1 wherein said anhydrotetracycline is anhydrotetracycline.

6. A process as in claim 1 wherein said solvent is benzene.

References Cited by the Examiner

UNITED STATES PATENTS 3,146,265  8/1964  Scott et al. _____ 204—559

JOHN H. MACK, *Primary Examiner.*

H. S. WILLIAMS, *Examiner.*